(12) United States Patent
Baker

(10) Patent No.: X6097
(45) Date of Patent: Oct. 1, 1830

(54) LOCKS, WIRE SPRING FOR

(76) Inventor: Job Baker

Job Baker, New Bedford Massachusetts.

Letters Patent.

The Schedule referred to in these Letters Patent, and making part of the same, containing a description in the words of the said Job Baker, himself of his improvement in the Springs of Door Locks, and other Locks by means of Elastic wire called the wire Lock Spring.

To all persons to whom these presents shall come. Job Baker of the town of New Bedford in the County of Bristol in the State of Massachusetts sends Greeting.

Be it known that I, the said Job Baker, have invented, constructed made and applied to use a new and useful improvement in the Springs of Door Locks & other Locks by means of Elastic wire called the wire Lock Spring," as Specified in the words following namely. The Spring is to be made of wire of the diameter of about an eighth of an inch for a common size door lock, but may be larger or smaller, according to the size of the lock or the pleasure of the maker. The wire should be of iron of good quality & free from flaws, or it may be of any other Metal sufficiently tenacious and elastic.

The wire near its middle should pass spirally round a screw pivot or other fixtures placed upright in the usual way in the side plate of the lock, 2 or 3 times or more, so as to play freely round it and leave the two ends of the wire sufficiently long to reach the respective parts of the lock on which they are to operate.

The two ends will thus be nearly at right angles with each other in a common door lock, with the screw placed near the corner of the lock, and the ends must be be so fixed as to have a tendency to approach each other, so that when one end is pressed back the tendency of the other to press forward is thereby increased. —

One end of the wire spring should pass behind & press upon the inner end of the latch or bar, which is forced back by the knob & works on a spring when the door is opened or shut. The other end should pass in the direction of the bolt or bar which is propelled by the key and should be near to it, resting on the side of the lock, in which the screw or pivot is fixed, and should pass by the key hole, forming within the reach of the key a curve like that of the common tumbler, presenting the external part of the curve to the action of the key and should be turned up at right angles at the end, so that the part turned up may fit in a niche in the bolt, to retain it in its position.

The spring must be so bent, that the key may in its revolution before it removes the bolt, by its action on the curved part of the wire move the extreme end so turned up out of the niche in which it rested, & keep it suspended until the bolt is removed to a position suited to receive the end in another niche in the bolt, whereby it may be retained in the position in which the key leaves it.

This end or part of the wire is intended to perform all the office of the common tumbler and steel spring thereto attached, & to act on the same principle, generally in its connection with the key and bolt. The lock may be of any form or dimentions, & the size & form of the wire should be varied accordingly, the object chiefly to be attended to being that the wire should be of sufficient size to give the requisite spring and that while one passes on the end of the latch, the other should press on the side of the bolt, and the communication of elasticity be uninterupted from end to end of the wire wire. The improvement for which the said Sol Baker claims a patent consists in the application of one piece of common iron wire or other wire sufficiently Elastic in the manner described to the common door or other lock to answer all the purposes of the flat steel spring & of the tumbler and spring thereto attached. which are in common use & for which this improvement is intended to be a substitute & in the application of that part thereof which is intended as a substitute for the tumbler and spring thereto attached, which may be applied seperately by causing the other end of the wire beyond the spiral turn to bear upon the side of the lock or other fixture to support the spring.

In testimony that the above and foregoing is a true specification of my said improvement as therein described, I have hereunto set my hand and seal the third day of September in the year of our Lord one thousand eight hundred and thirty.

Witnessed

Jn.o L. Barclay
William Baker

Sol Baker

Ex.d
Ch.J.W.